United States Patent [19]

Takamizawa et al.

[11] Patent Number: 4,689,267

[45] Date of Patent: Aug. 25, 1987

[54] COMPOSITE HOLLOW FIBER

[75] Inventors: Minoru Takamizawa; Akira Yamamoto; Shigehiro Nagura, all of Joetsu, Japan

[73] Assignee: Shin-Etsu Chemical Co., Ltd., Tokyo, Japan

[21] Appl. No.: 759,308

[22] Filed: Jul. 26, 1985

[30] Foreign Application Priority Data

Jul. 26, 1984 [JP] Japan .................. 59-155968

[51] Int. Cl.$^4$ .................. B01D 59/10; D02G 3/00
[52] U.S. Cl. ........................... 428/376; 55/16; 55/158; 210/500.23; 428/391; 428/393; 428/394; 428/395; 428/398
[58] Field of Search .............. 428/375, 376, 391, 392, 428/393, 394, 395, 398; 427/230, 236, 245, 387; 264/46.6, 45.1, 41, 173, 177 F; 210/500.2, 506, 500.21, 500.23, 500.41; 55/16, 158

[56] References Cited

U.S. PATENT DOCUMENTS

| | | | |
|---|---|---|---|
| 3,611,676 | 10/1971 | Christen et al. | 55/16 |
| 4,032,440 | 6/1977 | Yasuda | 427/245 X |
| 4,214,020 | 7/1980 | Ward et al. | 210/500.2 X |
| 4,230,463 | 10/1980 | Henis et al. | 55/16 |
| 4,393,113 | 7/1983 | Sugie et al. | 210/500.2 X |
| 4,415,608 | 11/1983 | Epperson et al. | 427/244 |
| 4,567,245 | 1/1986 | Takamizawa et al. | 526/279 |
| 4,575,385 | 3/1986 | Brooks et al. | 210/500.2 X |
| 4,602,922 | 7/1986 | Cabasso et al. | 427/245 |

OTHER PUBLICATIONS

Journal of the American Chemical Society 105, 7473 (1983), "Poly[1-(trimethylsilyl)-1-propyne]: A New High Polymer Synthesized with Transition-Metal Catalysts and Characterized by Extremely High Gas Permeability", Toshio Masuda, et al.

Primary Examiner—Lorraine T. Kendell
Attorney, Agent, or Firm—Oblon, Fisher, Spivak, McClelland & Maier

[57] ABSTRACT

This invention provides a composite hollow fiber comprising a porous hollow fiber substrate and a coating layer formed on at least one of the outer surface and the inner surface of said substrate. The coating layer comprises a polymer having at least one of the structural units represented by the formula (I):

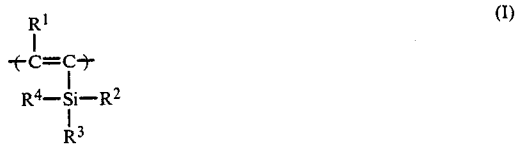

wherein $R^1$ represents a hydrogen atom or a lower alkyl group; $R^2$, $R^3$ and $R^4$, which may be identical or different, represent a hydrogen atom, a monovalent hydrocarbon group having 1 to 8 carbon atoms or a monovalent silicon-containing organic group.

This composite hollow fiber is excellent in gas permeability and gas separation performance and has high heat resistance, humidity resistance and mechanical strength.

10 Claims, No Drawings

COMPOSITE HOLLOW FIBER

BACKGROUND OF THE INVENTION

1. Field of the Invention

This invention relates to a composite hollow fiber, particularly to a composite hollow fiber which is excellent in permeability and separation performance of gases and which has good heat resistance, humidity resistance and mechanical strength.

2. Description of the Prior Art

Gas separation membranes are required first to have a good gas permeation rate, secondly a good separation factor for the gas component to be separated relative to the remaining gas components of the gaseous mixture, and thirdly heat resistance and humidity resistance to be able to withstand the temperature and humidity to which the membrane may be subjected during the gas separation operation, and the mechanical strength to withstand the pressure stresses and the like.

For increasing the gas permeation rate [cm$^3$(STP)/cm$^2$.sec.cmHg] with the use of a material having a small gas permeation coefficient [cm$^3$(SIP)cm/cm$^2$.sec.cmHg], it is required to make the membrane thinner or to enlarge the permeation surface area, and for this purpose, studies have been made about various thin membrane techniques or hollow fiber techniques. However, no satisfactory gas separation membrane has yet been obtained.

As a polymer having a large gas permeation coefficient, polysiloxane has been known but the membrane of this material has low mechanical strength. For improvement of the mechanical strength of the polysiloxane membrane, a gas separation membrane composed of a polysiloxanepolycarbonate copolymer has been proposed (U.S. Pat. No. 3,980,456), but this membrane has generally small gas separation factors and also insufficient mechanical strength.

For increasing the permeation surface area and the mechanical strength of the gas separation membrane, composite membranes having coatings of polysiloxane or siloxane copolymer on porous hollow fiber substrates have been proposed (Japanese Laid-open patent Publication No. 86684/1978). However, in practice, they have an unsatisfactory gas permeation rate and insufficient resistance to heat and humidity and mechanical strength of the coating layer; therefore, there is involved the disadvantage that the coating layer tends to readily peel off.

SUMMARY OF THE INVENTION

Accordingly, an object of the present invention is to provide a composite hollow fiber having high resistance to heat and humidity and good mechanical strength, which has a good gas permeation rate and gas separation performance, and so is particularly useful as gas separation membrane.

Another object of the present invention is to provide a composite hollow fiber which has improved light resistance in addition to the above various characteristics.

According to the present invention there is provided a composite hollow fiber comprising a porous hollow fiber substrate and a coating layer formed on at least one of the outer surface and the inner surface of said substrate, said coating layer comprising a polymer having at least one of the structural units represented by the general formula (I):

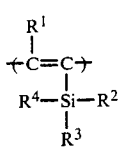

wherein $R^1$ represents a hydrogen atom or a lower alkyl group; $R^2$, $R^3$ and $R^4$, which may be identical or different, represent a hydrogen atom, a monovalent hydrocarbon group having 1 to 8 carbon atoms or a monovalent silicon-containing organic group.

The composite hollow fiber of the present invention has high gas permeability and gas separation performance and is therefore, excellent as a gas separation membrane. Particularly, it is useful for separation of oxygen from air, etc. Also, since it has high heat resistance, humidity resistance and mechanical strength, breaking or peel-off of the coating layer due to deterioration will hardly occur even under the conditions of pressurization, high temperature or high humidity, and the above-mentioned gas separation performance can be maintained for a long period.

The composite hollow fiber of the present invention can also be expected to be useful for separation of liquid mixtures such as of water and alcohol into the components thereof, particularly for liquid separation by pervaporation method.

DETAILED DESCRIPTION OF THE INVENTION

In the present specification, "gas separation factor" ($\alpha$) means the ratio of the permeation coefficients (P) [units: cm$^3$(STP)cm/cm$^2$sec.cmHg] or the permeation rates (Q) [units: cm$^3$(STP)/cm$^2$.sec.cmHg] of a given pair of gases through a gas permeating membrane. For example, the separation factor for oxygen/nitrogen $\alpha(O_2/N_2)$ for a membrane is defined as $P_{O_2}/P_{N_2}$ or $Q_{O_2}/Q_{N_2}$, and the separation performance for oxygen is greater as the value of the separation factor is greater.

The material for the porous hollow fiber substrate to be used in the present invention should preferably have an intrinsic separation factor for $O_2/N_2$ of at least 3.0, in order to enhance the oxygen separation performance of the composite hollow fiber obtained. Intrinsic separation factor herein means the separation factor for a given pair of gases for the material molded in a dense (i.e. non-porous) state.

As the material for the porous hollow fiber substrate, there may be employed any polymer which can be molded into a hollow fiber. Particularly suitable polymers are exemplified by polysulfones, styrene-containing copolymers such as acrylonitrile-styrene copolymers, polycarbonates, cellulose derivatives, polyamides, polyimides, polyethers, polyesters, vinyl polymers, acetylene polymers, etc., and further copolymers and mixed polymers thereof.

For preparation of a porous hollow fiber with the use of these polymers, known methods can be utilized. For example, it can be prepared according to a process comprising the steps of preparing a homogeneous dope by dissolving a polymer in an appropriate solvent, followed by filtration and defoaming, discharging the dope through an annular double nozzle, evaporating a part of the solvent in the discharged dope, coagulating the dope by introducing it into a poor solvent or a non-solvent, and subjecting the wet hollow fiber thus obtained to drying and heat treatment.

In the above preparation process, porosity can also be imparted by mixing an inorganic material into the dope.

In the composite hollow fiber of the present invention, it is essentially required to use a polymer comprising at least one of the structural units represented by the above formula (I), (hereinafter referred to as "silicon-containing substituted polyacetylene compound").

In the above formula (I), $R^1$ is a hydrogen atom or a lower alkyl group such as methyl, ethyl, propyl, butyl or the like, and $R^2$, $R^3$ and $R^4$, which may be identical or different, represent a hydrogen atom, a monovalent hydrocarbon group having 1 to 8 carbon atoms, for example, a $C_1$-$C_8$ alkyl group such as methyl, ethyl, propyl, butyl or the like; a $C_6$-$C_8$ aryl group such as phenyl or the like, or a silicon-containing monovalent organic group exemplified by the general formula:

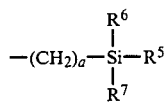

wherein $R^5$ represents a $C_1$-$C_3$ alkyl, $C_1$-$C_3$ halogenated alkyl or phenyl group, and a is an integer of 1 to 3. Preferably, $R^1$ is methyl group and $R^2$, $R^3$ and $R^4$, which may be identical or different, are methyl group, ethyl group or a silicon-containing monovalent organic group represented by the general formula:

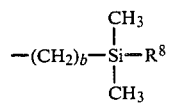

wherein $R^8$ is methyl or chloromethyl, and b is an integer of 1 or 2.

The silicon-containing substituted polyacetylene compound can be prepared by homopolymerization or copolymerization of at least one silicon-containing substituted acetylene compounds (monomers) represented by the general formula:

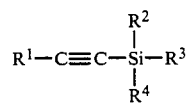

wherein $R^1$, $R^2$, $R^3$ and $R^4$ are the same as defined above. For example, it can be prepared by homopolymerization or copolymerization of these monomers in an organic solvent such as toluene, cyclohexane etc. in the presence of a polymerization catalyst such as $W Cl_6$, $NbCl_5$, $TaCl_5$, etc. at a temperature of 30° to 130° C., and the polymer formed is precipitated in methanol and recovered after purification. The polymerization method shown here is exemplary and not limitative of the present invention.

It is also possible in the above polymerization to copolymerize a silicon-containing substituted acetylene compound of the formula a (II) with another acetylene derivative containing no silicon atom. Alternatively, a part of unsaturated bonds in the polymer obtained by polymerization may be hydrogenated. Accordingly, the silicon-containing substituted polyacetylene compound used in the invention can have structural units other than those of the formula I, but it is desirable that the structural units represented by the formula (I) should exist in the polymer at a proportion of at least 50 mol %, more preferably at least 80 mol %. One or more kinds of the silicon-containing substituted polyacetylene compounds may be used singly or in combination.

The silicon-containing substituted polyacetylene compound is required to have a weight average molecular weight ($\overline{Mw}$) calculated as polystyrene of $1 \times 10^5$ or higher, preferably $2 \times 10^5$ or higher. If the weight average molecular weight is lower than $1 \times 10^5$, the mechanical strength of the coating layer obtained will become impractically lower.

Meanwhile, in a preferred embodiment of the present invention, the coating layer further comprises a polytrimethylvinylsilane compound in addition to the above silicon-containing substituted polyacetylene compound. By combination of a polytrimethylvinylsilane compound with the above silicon-containing substituted polyacetylene compound, it is possible to obtain a composite hollow fiber with improved light resistance, particularly UV-ray resistance, in addition to heat resistance, humidity resistance and mechanical strength. Such a composite hollow fiber has the advantage that it can be used over a long period without causing a decline in gas separation performance even under the condition of exposure to light.

The above silicon-containing substituted polyacetylene compound and the polytrimethylvinylsilane can be mixed generally with the use of an appropriate solvent to give a homogeneous composition solution because of their high affinity. The composition solution can be molded into a film by way of casting etc., followed by removal of the solvent, to give a molded product such as a film, etc. which is homogeneous and has high transparency. Also, when applied on a hollow fiber substrate, a homogeneous coating layer can similarly be obtained.

The polytrimethylvinylsilane to be employed in the above embodiment is disclosed in J. Polymer Sci. 4, 1053 (1964), and it can economically be prepared by anion polymerization of trimethylvinylsilane monomer previously dehydrated and purified in the presence of a predetermined amount of n-butyl lithium in an inert gas atmosphere at 50° to 70° C. for 20 to 50 hours.

The polytrimethylvinylsilane should preferably have a weight average molecular weight calculated as polystyrene of $1 \times 10^5$ or higher, more preferably $2 \times 10^5$ or higher. if the weight average molecular weight is lower than $1 \times 10^5$, the coating layer obtained will have impractically poor mechanical strength.

The proportions of the silicon-containing substituted polyacetylene compound and the polytrimethylvinylsilane compound, which can be set optimally depending on the desired separation factor and oxygen permeation rate of the coating layer, may preferably be 10 to 95% by weight of the silicon-containing substituted polyacetylene compound and 90 to 5% by weight of the polytrimethylvinylsilane compound. More preferably, the silicon-containing substituted polyacetylene may be 50 to 95% by weight and the polytrimethylvinylsilane 50 to 5% by weight. If the proportion of the silicon-containing substituted polyacetylene is less than 10% by weight, the mechanical strength of the coating layer obtained will be insufficient, while at a level of the polytrimethylvinylsilane compound less than 5% by weight, the light resistance of the coating layer can he enhanced only with difficulty.

The composite hollow fiber of the present invention can be prepared by dissolving the above silicon-containing substituted polyacetylene compounds or a mixture of said compound with the polytrimethylvinylsilane compound in an appropriate solvent to prepare a homogeneous solution generally at a concentration of 0.1 to 10% by weight and uniformly coating a porous hollow fiber substrate separately prepared with said solution. The concentration of the polymer solution should preferably be controlled within the above range so that the visoosity of the solution may be several cP to 500 cP.

The solvent which may be used for preparation of the polymer solution may include hydrocarbons such as benzene, toluene, xylene, cyclohexane and n-pentane, halogenated hydrocarbons such as chloroform, carbon tetrachloride, tetrachloroethylene and fluoromethanes, cyclic ethers such as tetrahydrofuran and the solvent mixtures of these. Generally speaking, it is preferable to choose a solvent which does not dissolve the porous hollow fiber substrate. However if a solvent which can slightly dissolve the porous hollow fiber substrate is employed, the surface of the porous hollow fiber substrate is made dense; therefore the separation factors of the composite hollow fiber obtained can be made greater by controlling the degree of the density of the surface of the substrate. Therefore, such a solvent may also be available as desired.

As methods for coating a porous hollow fiber substrate with the polymer solution as prepared above, there may be employed the method in which said substrate is dipped in the polymer solution, withdrawn therefrom and dried, or the method in which the polymer solution is applied by spraying or brushing on the porous hollow fiber substrate, followed by drying. Also, the polymer solution may be delivered through the inner portion of the porous hollow fiber substrate, followed by drying, so that a composite hollow fiber having a coating layer on the inner surface of the hollow fiber substrate can be obtained. These coating operations can be applied not only once but repeated for a plurality of times.

By the coating treatment as described above there oan be formed a coating layer composed of a silicon-containing substituted polyacetylene compound or composed of said polyacetylene compound and a polytrimethylvinylsilane compound on the surface of a porous hollow fiber substrate. Said coating layer may be considered to form a structure in which it penetrates partially into the pores of the hollow fiber substrate, so that said coating layer is in occluding contact with the porous substrate.

EXAMPLES

The present invention is described in more detail with reference to the following examples by which the scope of the present invention is not limited.

EXAMPLE 1

(1) A 25 wt. % solution of a polysulfone supplied by Union Carbide Co.) in dimethylformamide was discharged through a double nozzle with an inner diameter of nozzle for discharging wall material of 0.8 mm, an outer diameter of the capillary for core liquid of 0.5 mm and an inner diameter of the capillary for core liquid of 0.3 mm, using water as the core liquid, permitted to run in the air for 200 mm and then led into a coagulation bath of water at 3° C. so as to be spun therein, followed by washing with water and drying to produce a porous hollow fiber substrate of polysulfone.

The separation factor for oxygen/nitrogen for the non-porous homogeneous film obtained from the dimethylformamide solution of the polysulfone used here was found to be 5.8.

The oxygen permeation rate through the above polysulfone porous hollow fiber substrate was found to be $3.8 \times 10^{-4}$ [cm$^3$(STP)/cm$^2$. sec.cmHg], and its separation factor for oxygen/nitrogen 1.0.

(2) One part by weight of tantalum pentachloride (TaCl$_5$) was dissolved in 200 parts by weight of toluene, 10 parts by weight of 1-methyl-2-trimethylsilylacetylene CH$_3$—C≡C—Si(CH$_3$)$_3$ were added to the solution and polymerization was carried out at 80° C. for 10 hours. The reaction mixture obtained was poured into an excessive amount of methanol to precipitate the polymer formed, followed by purification to obtain a poly(1-methyl-2-trimethylsilylacetylene) having a weight average molecular weight ($\overline{Mw}$) calculated as polystyrene of $2.0 \times 10^6$:

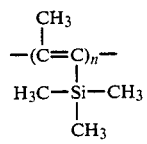

The oxygen permeation coefficient of the film obtained by casting of a solution of the thus obtained poly(1-methyl-2-trimethylsilylacetylene) in n-pentane (polymer conc. 0.2 wt. %) on a flat plane was found to be $6.5 \times 10^{-7}$ [cm$^3$(STP)cm/cm$^2$.sec.cmHg], with the intrinsic separation for oxygen/nitrogen being 1.5.

The above results are shown in Table 1.

(3) In 0.2 wt. % solution of the polyl(1-methyl-2-trimethylsilylacetylene) obtained in the above (2) in n-pentane, the polysulfone porous hollow fiber substrate prepared in (1) was dipped for one minute, then withdrawn therefrom and dried. This operation was repeated twice to obtain a composite hollow fiber having a coating layer on the outer surface of the substrate. The film of the poly(1-methyl-2-trimethylsilylacetylene) was found to be firmly adhered to the hollow fiber substrate to exhibit good coating state. The oxygen permeation rate through the composite hollow fiber was found to be $1.0 \times 10^{-4}$ [cm$^3$(STP)/cm$^2$.sec.cmHg], with the separation factor for oxygen/nitrogen being 2.6. When the composite hollow fiber was subjected to harsh treatment under the conditions of 70° C. and 90% RH for 72 hours, no peel-off the coating layer occurred, and the oxygen permeation rate after the harsh treatment was found to be $7.1 \times 10^{-5}$ [cm$^3$(STP)/cm$^2$.sec.cmHg], with the separation factor for oxygen/nitrogen being as good as 2.8, thus proving to be good in both heat resistance and humidity resistance. These results are summarized in Table 2.

EXAMPLE 2

(1) For the porous hollow fiber substrate, the same polysulfone porous hollow fiber as prepared in Example 1 (1) was employed.

(2) In 160 parts by weight of toluene, 1 part of tantalum pentachloride was dissolved and to the resultant solution were added 7 parts by weight of 1-methyl-2-(1',1',3',3'-tetramethyl-1',3'-disila-butyl)-acetylene:

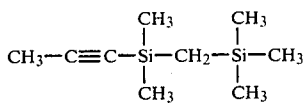

Polymerization was carried out at 80° C. for 3 hours, and the reaction mixture obtained was poured into an excessive amount of methanol to precipitate the polymer formed, followed by purification, to obtain a copolymer having a weight average molecular weight ($\overline{Mw}$) calculated as polystyrene of $1.8 \times 10^6$. The oxygen permeation coefficient of the film obtained by casting of a solution of the copolymer in n-pentane (polymer conc. 0.5 wt. %) on a flat plane was found to be $2.3 \times 10^{-7}$ [cm$^3$(STP)cm/cm$^2$.sec.cmHg], with the intrinisic separation factor for oxygen/nitrogen being 2.5.

The above results are shown in Table 1.

In 0.5 wt. % solution of the copolymer in n-pentane obtained in the above (2), the polysulfone porous hollow fiber substrate prepared in (1) was dipped for two minutes, then withdrawn therefrom and dried, to give a composite hollow fiber having a coating layer. The coating state of the copolymer was found to be good, with a uniform coating layer adhered firmly to the substrate being formed. The oxygen permeation rate through the composite hollow fiber was found to be $2.6 \times 10^{-5}$ [cm$^3$tSTP)/cm$^2$.sec.cmHg], with the separation factor for oxygen/nitrogen being 4.4. When the composite hollow fiber was subjected to harsh treatment under the same conditions as in Example 1, no peel-off of the coating layer occurred. The oxygen permeation rates and the separation factor for oxygen/nitrogen before and after the harsh treatment are shown in Table 2.

EXAMPLE 3

(1) For the porous hollow fiber substrate, the same polysulfone porous hollow fiber as prepared in Example 1 (1) was employed.

(2) A 0.3 wt. % n-pentane solution of a mixture of 7 parts by weight of the poly(1-methyl-2-trimethylsilylacetylene) having a weight average molecular weight ($\overline{Mw}$) calculated as polystyrene of $2.0 \times 10^6$ obtained by polymerization of 1-methyl-2-trimethylsilylacetylene according to the same procedure as in Example 1 and 3 parts by weight of the poly[1-methyl-2-(1',1',3',3'-tetramethyl-1',3'-disila-butyl)acetylene] obtained by polymerization of 1-methyl-2-(1',1', 3',3'-tetramethyl-1',3'-disila-butyl)acetylene according to the same prooedure as in Example 1 was prepared. The oxygen permeation coefficient and the intrinsic separation factor for oxygen/nitrogen through the film prepared by casting of said solution on a flat plane were measured. The results are as shown in Table 1.

(3) By repeating twice the operation of dipping the above polysulfone porous hollow fiber in the above polymer solution for 2 minutes, withdrawing therefrom and drying, a composite hollow fiber having a coating layer was obtained. The coating layer was found to be firmly adhered to the substrate. When said hollow fiber was subjected to the harsh treatment under the same conditions as in Example 1, no peel-off of the coating layer occurred. Ihe oxygen permeation rates and the separation factor for oxygen/nitrogen before and after the harsh treatment are shown in Table 2.

EXAMPLE 4

(1) For the porous hollow fiber substrate, the same polysulfone porous hollow fiber as prepared in Example 1 (1) was employed.

(2) To 100 g of trimethylvinylsilane was added 0.2 ml of 15% hexane solution of n-butyl lithium and, under nitrogen atmosphere, polymerization was carried out under anhydrous condition at 60° C. for 10 hours. The polymer formed was dissolved in one liter of cyclohexane and then poured in an excess of methanol to be precipitated, followed by purification, to give a poly(trimethylvinylsilane) having a weight average molecular weight (w/ ) calculated as polystyrene of $4.2 \times 10^5$.

A 0.4 wt. % n-pentane solution of a mixture of 8 parts by weight of the poly(1-methyl-2-trimethylsilylacetylene) having a weight average molecular weight ($\overline{Mw}$) calculated as polystyrene of $2.0 \times 10^6$ obtained by polymerization of 1-methyl-2-trimethylsilylacetylene according to the same prooedure as in Example 1 and 2 parts by weight of the above poly(trimethylvinylsilane) was prepared. The oxygen permeation coefficient and the intrinsic separation factor for oxygen/nitrogen for the film prepared by casting of said solution were measured to obtain the results as shown in Table 1.

(3) By performing once the operation of dipping the above polysulfone porous hollow fiber in the above polymer solution for 2 minutes, withdrawing therefrom and drying, a composite hollow fiber having a coating layer was obtained. The coating layer was found to be firmly adhered to the substrate. When said composite hollow fiber was subjected to the harsh treatment under the same conditions as in Example 1, no peel-off of the coating layer occurred. The oxygen permeation rates and the separation factors for oxygen/nitrogen before and after the harsh treatment are shown in Table 2.

EXAMPLE 5

(1) A porous hollow fiber composed of an acrylonitrilestyrene oopolymer was prepared by wet spinning of said copolymer, namely by discharging a 25.0 wt. % solution of a copolymer comprising 63% acrylonitrile and 37% styrene (supplied by Asahi Dow) in a solvent mixture of dimethylformamide/formamide (93/7, weight ratio) through a double nozzle with an inner diameter of nozzle for discharging wall material of 0.8 mm, an outer diameter of the capillary for core liquid of 0.5 mm and an inner diameter of the capillary for core liquid of 0.3 mm, using water as the core liquid, into a coagulation water bath of 3° C.

The separation factor for oxygen/nitrogen for the non-porous homogeneous film obtained from the dimethylformamide/formamide (93/7) solution of said acrylonitrile-styrene copolymer used here was found to be 3.8.

The oxygen permeation rate through the above acrylonitrilestyrene copolymer porous hollow fiber substrate was found to be $2.8 \times 10^{-4}$ [cm$^3$(STP)/cm$^2$.sec.cmHg], and its separation factor for oxygen/nitrogen 1.0.

(2) According to the same procedure as in Example 1 except that the above acrylonitrile-styrene copolymer porous hollow fiber was used as the substrate in place of the polysulfone porous hollow fiber, the coating layer of poly(1-methyl-2-trimethylsilylacetylene) was formed on the surface of the substrate to obtain a composite hollow fiber. The coating layer was found to be firmly adhered to the substrate. When said hollow fiber was subjected to the harsh treatment under the same conditions as in Example 1, no peel-off of the coating layer occurred. The oxygen permeation rates and the separation factor for oxygen/nitrogen before and after the cruel treatment are shown in Table 2.

EXAMPLE 6

(1) For the porous hollow fiber substrate the same aorylonitrile-styrene copolymer porous hollow fiber as used in Example 5 was employed.

(2) In 130 parts by weight of toluene was dissolved 1 part of tantalum pentachloride, and to the resultant solution was added 10 parts by weight of 1-methyl-2-(1′,1′,3′,3′-tetramethyl-1′,3′-disila-butyl)-acetylene:

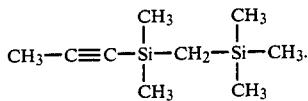

Polymerization was carried out at 80° C. for 24 hours, and the reaction mixture obtained was poured into an excessive amount of methanol to precipitate the polymer formed, followed by purification, to obtain a copolymer having a weight average molecular weight (Mw) calculated as polystyrene of $1.5 \times 10^6$. The oxygen permeation coefficient of the film obtained by casting of a solution (polymer conc. 0.5 wt. %) of the copolymer in n-pentane on a flat plane was found to be $8.1 \times 10^{-9}$ [$cm^3$(STP)cm/ $cm^2$.sec.cmHg], with the intrinsic separation factor for oxygen/nitrogen being 3.6.

The above results are shown in Table 1.

(3) In 0.5 wt. % solution of the copolymer obtained in the above (2) in n-pentane, the acrylonitrile-styrene copolymer of porous hollow fiber substrate prepared in (1) was dipped for two minutes, then withdrawn therefrom and dried, to give a composite hollow fiber. The coating state of the copolymer was found to be good, with a uniform coating layer being formed. When the composite hollow fiber was subjected to harsh treatment under the same conditions as in Example 1, no peel-off of the coating layer occurred. The oxygen permeation rates and the separation factors for oxygen/nitrogen before and after the harsh lreatment are shown in Table 2.

COMPARATIVE EXAMPLE 1

(1) For the porous hollow fiber substrate, the same polysulfone porous hollow fiber as prepared in Example 1 (1) was employed.

(2) By repeating five times the operation of dipping the polysulfone porous hollow fiber in a 2.0 wt. % solution of a paste-like room-temperature-vulcanizable silicone rubber trade name: KE-44, produced by Shin-Etsu Chemical Co., Ltd.) in toluene for one minute, withdrawing and drying, a composite hollow fiber having a coating layer was prepared. The oxygen permeation rate through the composite hollow fiber was found to be as small as $4.5 \times 10^{-6}$ [$cm^3$(STP)/$cm^2$.sec.cmHg], with the separation factor for oxygen/nitrogen being 3.0. When the composite hollow fiber was subjected to harsh treatment under the same conditions as in Example 1, peel-off of the coating layer occurred. The separation factor for oxygen/nitrogen after the harsh treatment was found to be 1.1, thus markedly lower in separation performance. These results are also shown in Tables 1 and 2.

TABLE 1

| | Porous hollow fiber substrate | | | Material for coating layer | | | |
| | | Intrinsic[1] $\alpha(O_2/N_2)$ for dense film | $\alpha(O_2/N_2)$[2] for porous hollow fiber substrate | | | Dense film | |
| | Material | | | Kind[3] | Mw | $P_{O_2}$ | Intrinsic[1] $\alpha(O_2/N_2)$ |
|---|---|---|---|---|---|---|---|
| Example 1 | Polysulfone | 5.8 | 1.0 | Polymer of A | $2.6 \times 10^6$ | $6.5 \times 10^{-7}$ | 1.5 |
| Example 2 | Polysulfone | 5.8 | 1.0 | Copolymer of A and B (weight ratio: 1/1) | $1.8 \times 10^6$ | $2.3 \times 10^{-7}$ | 2.5 |
| Example 3 | Polysulfone | 5.8 | 1.0 | 7/3 Blend of polymer of A and polymer of B | Polymer of A $2.0 \times 10^6$ Polymer of B $1.8 \times 10^6$ | $3.2 \times 10^{-7}$ | 2.2 |
| Example 4 | Polysulfone | 5.8 | 1.0 | 8/2 Blend of polymer of A and polymer of C | Polymer of A $2.0 \times 10^6$ Polymer of C $4.2 \times 10^5$ | $1.2 \times 10^{-7}$ | 2.0 |
| Example 5 | Acrylonitrile-styrene copolymer | 3.8 | 1.0 | Polymer of A | $2.6 \times 10^6$ | $6.5 \times 10^{-7}$ | 1.5 |
| Example 6 | Acrylonitrile-styrene copolymer | 3.8 | 1.0 | Polymer of C | $1.5 \times 10^6$ | $8.1 \times 10^{-9}$ | 3.6 |
| Comparative | Polysulfone | 5.8 | 1.0 | Polysiloxane | — | $3.5 \times 10^{-8}$ | 2.0 |

TABLE 1-continued

| | Porous hollow fiber substrate | | | Material for coating layer | | | |
|---|---|---|---|---|---|---|---|
| | Intrinsic[1] $\alpha(O_2/N_2)$ for dense film | $\alpha(O_2/N_2)$[2] for porous hollow fiber substrate | | | | Dense film | |
| Material | | | Kind[3] | $\overline{Mw}$ | $P_{O_2}$ | Intrinsic[1] $\alpha(O_2/N_2)$ | |
| Example 1 | | | | | | | |

Notes for Table 1:
[1] Separation factors obtained as the ratios of the permeation coefficient for $O_2$ to the permeation coefficient for $N_2$.
[2] Separation factors obtained as the ratios of the permeation rate of $O_2$ to the permeation rate of $N_2$.
[3] Structures of monomers:

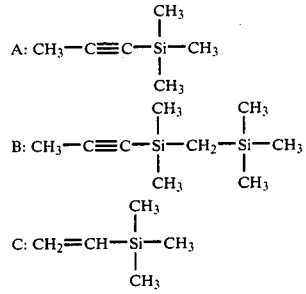

TABLE 2

| | Coating solution conc. (wt. %) | Number of coating operation | Composite hollow fiber | | | |
|---|---|---|---|---|---|---|
| | | | Before harsh treatment* | | After harsh treatment | |
| | | | $O_2$ permeation rate $Q_{O_2}$ | $\alpha(O_2/N_2)$ | $O_2$ permeation rate $Q_{O_2}$ | $\alpha(O_2/N_2)$ |
| Example 1 | 0.2 | 2 | $1.0 \times 10^{-4}$ | 2.6 | $7.1 \times 10^{-5}$ | 2.8 |
| Example 2 | 0.5 | 1 | $2.6 \times 10^{-5}$ | 4.4 | $2.1 \times 10^{-5}$ | 4.5 |
| Example 3 | 0.3 | 2 | $2.9 \times 10^{-5}$ | 3.8 | $2.3 \times 10^{-5}$ | 4.0 |
| Example 4 | 0.4 | 1 | $4.5 \times 10^{-5}$ | 3.4 | $3.2 \times 10^{-5}$ | 3.6 |
| Example 5 | 0.2 | 2 | $1.1 \times 10^{-4}$ | 2.4 | $8.0 \times 10^{-5}$ | 2.7 |
| Example 6 | 0.5 | 1 | $4.1 \times 10^{-5}$ | 3.7 | $3.3 \times 10^{-5}$ | 3.9 |
| Comparative Example 1 | 2.0 | 5 | $4.5 \times 10^{-6}$ | 3.0 | $2.2 \times 10^{-4}$ | 1.1 |

Note:
*Harsh treatment conditions: 70° C., 90% RH, left to stand for 72 hours.

We claim:

1. A composite hollow fiber comprising a porous hollow fiber substrate and a coating layer formed on at least one of the outer surface and the inner surface of said substrate, said coating layer comprising a polymer having at least one of the structural units represented by the formula (I):

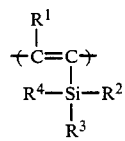  (I)

wherein $R^1$ represents a hydrogen atom or a lower alkyl group; $R^2$, $R^3$ and $R^4$, which may be identical or different, represent a hydrogen atom, a monovalent hydrocarbon group having 1 to 8 carbon atoms or a monovalent silicon-containing organic group.

2. A composite hollow fiber according to claim 1, wherein $R^1$ is a hydrogen atom or methyl group, $R^2$, $R^3$ and $R^4$, which may be identical or different, are a hydrogen atom, a $C_1$-$C_8$ alkyl group, a $C_6$-$C_8$ aryl group or a group of the general formula:

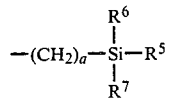

wherein $R^5$ represents a $C_1$-$C_3$ alkyl, $C_1$-$C_3$ halogenated alkyl or phenyl group, $R^6$ and $R^7$, which may be identical or different, are a $C_1$-$C_3$ alkyl group, and a is an integer of 1 to 3.

3. A composite hollow fiber according to claim 2, wherein $R^2$, $R^3$ and $R^4$ represent methyl group, ethyl group or a group of the general formula:

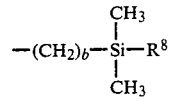

wherein $R^8$ represents methyl or chloromethyl group, and b is an integer of 1 or 2.

4. A composite hollow fiber according to claim 3, wherein $R^1$, $R^2$, $R^3$ and $R^4$ represent methyl group.

5. A composite hollow fiber according to claim 3, wherein $R^1$, $R^2$ and $R^3$ represent methyl group and $R^4$ represents a group of the formula:

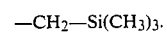

6. A composite hollow fiber according to claim 1, wherein said polymer contains at least 50% of the structural units of the general formula (I).

7. A composite hollow fiber according to claim 6, wherein said polymer contains at least 80% of the structural units of the general formula (I).

8. A composite hollow fiber according to claim 1, wherein said polymer has a weight average molecular weight calculated as polystyrene of at least $1 \times 10^5$.

9. A composite hollow fiber according to claim 1, wherein the material for the porous hollow fiber substrate has an intrinsic separation factor for oxygen/nitrogen of at least 3.0.

10. A composite hollow fiber according to claim 1, wherein the porous hollow fiber substrate is comprised of a polysulfone, a styrene copolymer, a polycarbonate, a cellulose derivative, a polyamide, a polyimide, a polyether, a polyester, a vinyl polymer, an acetylene polymer or a mixture of these.

* * * * *